United States Patent [19]

Ikegami et al.

[11] Patent Number: 5,158,352
[45] Date of Patent: Oct. 27, 1992

[54] HEADLAMP

[75] Inventors: Masahiko Ikegami, Kumamoto; Kaoru Hatanaka, Niiza; Tsuneo Sekiguchi, Tokyo; Hideyuki Tanabe, Yokohama; Satoru Suzuki, Iohjkawa, all of Japan

[73] Assignee: Honda Giken Kogyo Kabushiki Kaisha, Tokyo, Japan

[21] Appl. No.: 647,439

[22] Filed: Jan. 29, 1991

[30] Foreign Application Priority Data

Jan. 31, 1990 [JP] Japan ................. 2-21073
Feb. 15, 1990 [JP] Japan ................. 2-32596

[51] Int. Cl.$^5$ .................. B60Q 1/02; B60Q 1/10
[52] U.S. Cl. ................... 362/71; 362/61; 362/72; 362/284; 362/319
[58] Field of Search ............ 362/61, 66, 71, 72, 362/80, 284, 324, 322, 277, 319, 351, 282

[56] References Cited

U.S. PATENT DOCUMENTS

| | | | |
|---|---|---|---|
| 2,015,935 | 10/1935 | Herring | 362/284 |
| 3,598,989 | 8/1971 | Biggs | 362/61 |
| 4,875,141 | 10/1989 | Miyauchi et al. | 362/61 |
| 4,922,390 | 5/1990 | Nakazawa et al. | 362/72 |
| 4,985,816 | 1/1991 | Seko et al. | 362/61 |

FOREIGN PATENT DOCUMENTS

| | | | |
|---|---|---|---|
| 3241713 | 5/1984 | Fed. Rep. of Germany | 362/66 |
| 294598 | 12/1988 | Fed. Rep. of Germany | 362/80 |
| 63158701 | 7/1988 | Japan | |
| 6441484 | 2/1989 | Japan | |
| 1244934 | 9/1989 | Japan | |

Primary Examiner—Ira S. Lazarus
Assistant Examiner—Y. Quach
Attorney, Agent, or Firm—Irving M. Weiner; Joseph P. Carrier; Pamela S. Burt

[57] ABSTRACT

A headlamp provided with correcting means for correcting a light distribution characteristic which is caused by an inclination of a vehicle body with respect to a road surface. An outer lens section fixed to the vehicle body is provided forwardly of a lamp body section of the projector type which is pivoted around an optical axis so as to maintain the light distribution characteristic horizontal in response to the inclination of the vehicle body, and the outer lens section has a lens cut formed thereon for diffusing a variation component of passing light to a turning direction when the car body is inclined for turning. Alternatively a light stopping plate for stopping a part of light advancing from a reflecting mirror toward a convex lens is provided at a position of a focus of the convex lens on the reflecting mirror side for tilting around an optical axis, and a bearing for tiltably supporting the light stopping plate is provided on the optical axis in a displaced relationship to the reflecting mirror side with respect to the light stopping plate.

5 Claims, 6 Drawing Sheets

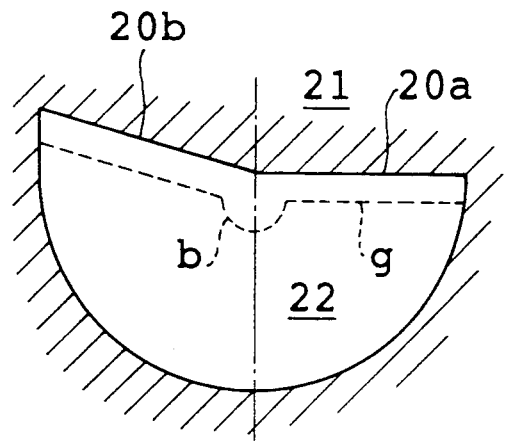
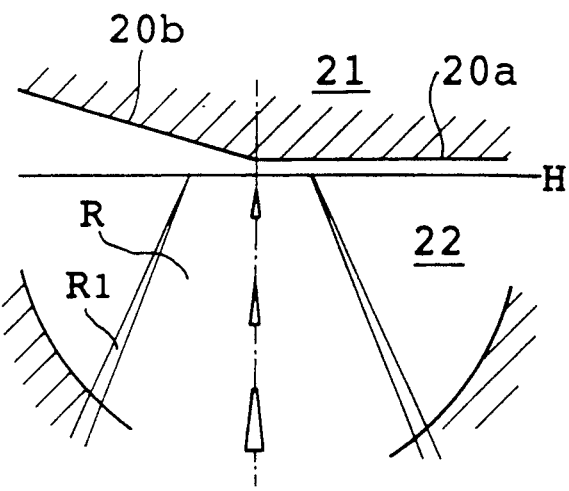
FIG. 8a  FIG. 8b
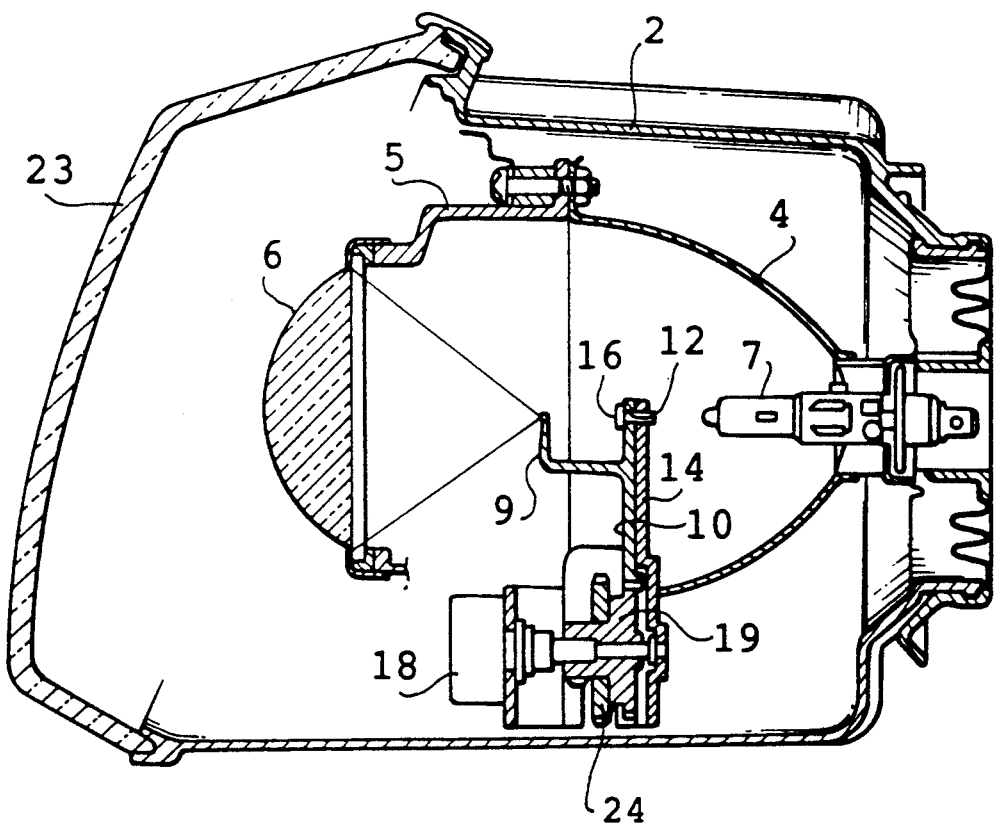
FIG. 9

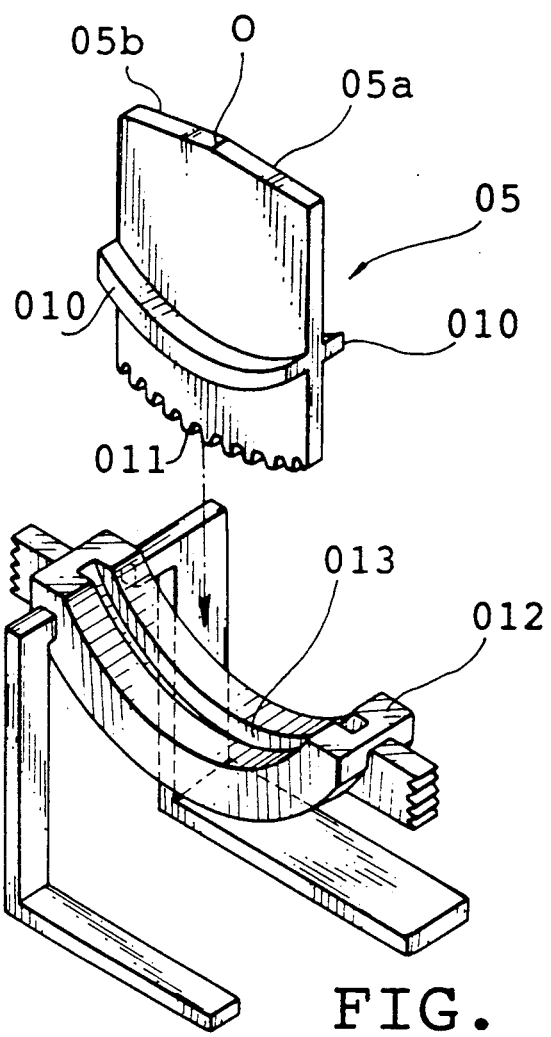
FIG. 12
PRIOR ART
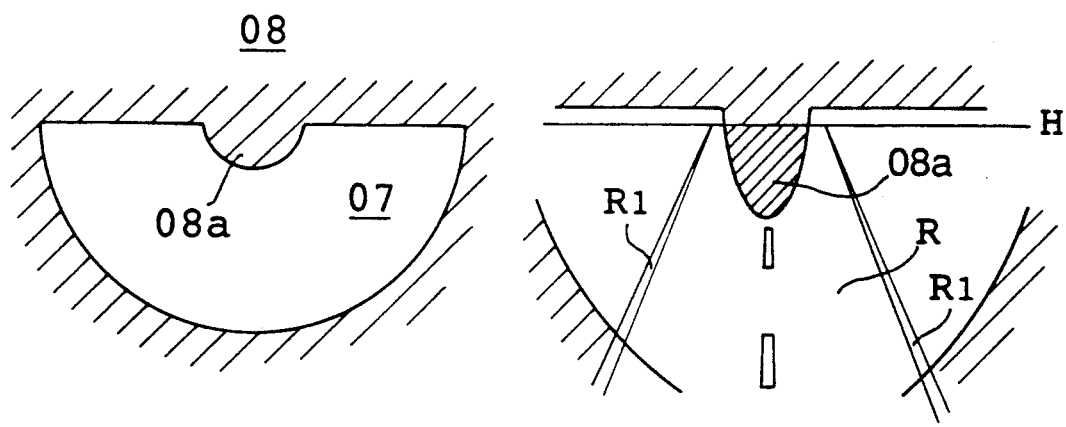
FIG. 13a
PRIOR ART
FIG. 13b
PRIOR ART

HEADLAMP

BACKGROUND OF THE INVENTION

1. Field of the Invention

The present invention relates to a headlamp, and more particularly to a so called cornering headlamp which is formed so as to correct a light distribution characteristic which is caused by an inclination of a motorcycle or the like wherein a vehicle body is liable to be inclined with respect to a road surface.

2. Discussion of Relevant Art

FIG. 10 shows an example of such a conventional cornering headlamp 030 of the type mentioned as is disclosed in the Official Gazette of Japanese Patent Laid-Open No. 41484/1989, and an inclination sensor 021 which makes use of a gyroscope or ultrasonic waves is provided on a vehicle body 020 while a headlamp body 031 is constructed for pivotal movement around an optical axis relative to the vehicle body 020. When an inclination is detected by the inclination sensor 021, the headlamp body 031 is pivoted with respect to a road surface 022 in response to an output of the inclination sensor 021. The headlamp body 031 is pivoted by a driving device 023 which makes use of a motor or the like so that the degree of such pivotal movement may be such that the light distribution characteristic may be parallel to the road 22, that is, the light distribution characteristic may be the same as that when the vehicle body stands upright.

However, with a motorcycle, since the irradiation distance in an advancing direction upon cornering becomes shorter than that upon straightforward advancement, if the light distribution characteristic is only corrected to a horizontal direction, there is the possibility that the resulting effect cannot be exhibited sufficiently even though such complicated construction as described above is employed.

On the other hand, a headlamp is known which is constituted such that a predetermined light distribution pattern may be formed by stopping a part of the light radiating from a light source by means of a light stopping plate disposed on a front opening side of a reflecting mirror. A headlamp of the type mentioned is disclosed in the Official Gazette of Japanese Patent Laid-Open No. 158701/1988 wherein the light stopping plate is tilted leftwardly or rightwardly in response to an inclination of the vehicle body to change the light distribution pattern so as to normally present a good light distribution to required portions forwardly of the vehicle body.

The aforementioned Official Gazette No. 158701/1988 discloses a headlamp 01 as shown in FIG. 11. This headlamp is constituted such that a light source 03 is disposed at a first focus $F_1$ of a reflecting mirror 02 having a reflecting face of an ellipsoid of revolution, and light reflected from the reflecting mirror 02 is focused upon a second focus $F_2$ and then introduced into a convex lens 04, whereafter it is projected forwardly from the convex lens 04, and a stopping plate 05 is provided between the reflecting mirror 02 and the convex lens 04. The center of an upper edge of the stopping plate 05 is positioned on an optical axis X—X, while a left upper edge portion 05a extends horizontally at a same height as the optical axis, and a right upper edge portion 05b is inclined downwardly. Since light to be introduced into a lower half portion of the convex lens 04 from an upper half portion of the reflecting mirror 02 is stopped by the stopping plate 05, if light from the convex lens 04 is projected on a projection plane 06 positioned sufficiently forwardly, then a light distribution pattern wherein a lower portion is a bright portion 07 and an upper portion is a dark portion 08 is obtained. A right horizontal bright/dark boundary line 09a corresponds to a real image of the left upper edge 05a of the stopping plate 05, while a left, leftwardly upwardly inclined bright/dark boundary line 09b corresponds to a real image of the upper edge 05b. Since a focus $F_3$ of the convex lens 04 is at a position a little forwardly of the stopping plate 05, however the degree of an out-of-focus condition of the image is low, and accordingly, the bright/dark boundary lines 09a and 09b obtained are clear lines.

While such a light distribution pattern is obtained when the vehicle body stands uprightly, if the headlamp 01 is inclined, for example, to the left-hand side together with the vehicle body, then the bright/dark boundary line 09b is tilted downwardly while the bright/dark boundary line 09a is tilted upwardly. Accordingly, in such instance, the stopping plate 05 is inclined to the right-hand side around the central point of the upper edge on the optical axis X—X to maintain the light distribution pattern shown in the figure.

To this end, the stopping plate 05 is supported for tilting motion as shown in FIG. 12. In particular, arcuate guided ribs 010, 010 centered at the central point O of the aforementioned upper edge are individually formed on the opposite faces of an intermediate portion of the stopping plate 05 in upward and downward directions while also a lower edge is formed in an arcuate shape centered at the aforementioned central point O and a gear 011 is formed on the lower edge. The stopping plate 05 is inserted into a slit 013 of an arcuate frame member 012 from above, and the guided ribs 010 are fitted for sliding movement in guide grooves formed in the opposite side walls of the slit 013 and having a same curvature as the guided ribs 010. The gear 011 projected downwardly from the frame member 012 is held in meshing engagement with a gear of a motor shaft (not shown), and when the motor is rotated, the guided ribs 010 are slidably moved along the guide grooves so that the stopping plate 05 is tilted leftwardly or rightwardly around the central point O, that is, the optical axis.

Since the headlamp disclosed in the aforementioned Official Gazette includes such stopping plate supporting and tilting device, the structure is complicated, and it cannot be avoided for the headlamp to be great in size.

By the way, a simplest method of supporting the stopping plate 05 for tilting motion around the central point O is to support the stopping plate 05 at the central point O by means of a bearing, but where such construction is employed, an upper half portion of the bearing will be projected upwardly above the central point O. However, since the bearing section is located very proximately to the position of a focus of the convex lens 04, a clear real image enlarged by the convex lens 04 is produced on the projection plane at a forward position, and the light distribution on a screen placed at a position spaced, for example, forwardly by 10 m is such as shown in FIG. 13a while the light distribution condition on a real road is such as shown in FIG. 13b. In those drawings, reference character 08a denotes a shadow (dark portion) produced by an image of the bearing section, and R denotes a road, $R_1$ a road shoulder, and H a horizontal line. Needless to say, such light distribution is not preferable.

SUMMARY OF THE INVENTION

The present invention makes it possible to extend irradiation upon the exterior in a turning direction to a remote position to solve the conventional subject above by providing, as particular means for solving the subject described above, a cornering headlamp provided with correcting means for correcting a light distribution characteristic which is caused by an inclination of a vehicle body with respect to a road surface. The cornering headlamp is characterized in that the correcting means includes a lamp body section of the projector type which is pivoted around an optical axis so as to maintain a horizontal condition of the light distribution characteristic in response to an output of inclination detecting means for detecting an inclination of the vehicle body, and an outer lens section provided in a fixed relationship on the vehicle body forwardly of the lamp body section and having a lens cut formed thereon for diffusing a variation component of passing light by pivotal motion of the lamp body section to a turning direction when the vehicle body is inclined.

Also, the present invention contemplates attainment of simplification and miniaturization of a stopping plate supporting mechanism, as well as prevention of appearance of a dark portion in a light distribution pattern arising from a bearing section by supporting such a stopping plate (light stopping plate) as described above by means of a bearing on an optical axis passing the central point of an upper edge of the stopping plate.

To this end, according to the invention, in a light distribution changing device for a headlamp wherein light from a light source is reflected by a reflecting mirror and then projected forwardly by way of a convex lens, the light distribution changing device being constituted such that a light stopping plate for stopping a part of light advancing from the reflecting mirror toward the convex lens is provided substantially at a position of a focus of the convex lens on the reflecting mirror side and the light distribution is changed by tilting the light stopping plate around an optical axis. A bearing for supporting the light stopping plate for tilting motion thereon is provided on the optical axis in a displaced relationship to the reflecting mirror side with respect to the light stopping plate.

According to the invention, since the light stopping plate is supported by means of the bearing on the optical axis which is an axial line of tilting motion of the light stopping plate, the supporting structure for the light stopping plate is simplified and miniaturized remarkably. Accordingly, the entire headlamp is reduced in size and cost. Besides, since the bearing is provided at a position displaced from the light stopping plate to the reflecting mirror side, that is, at a position spaced sufficiently from the focus of the convex lens to the reflecting mirror side, an image of the bearing projected by the convex lens is put into an out-of-focus condition at a remote place and will not have any influence upon a light distribution pattern.

BRIEF DESCRIPTION OF THE DRAWINGS

FIGS. 8a and 8b are drawings for explaining a light distribution obtained by the embodiment;

FIG. 9 is a longitudinal sectional view of a headlamp showing other embodiment of the present invention;

FIG. 12 is a fragmentary perspective view showing a stopping plate supporting structure of the headlamp of FIG. 11; and FIGS. 13a and 13b are drawings for explaining a light distribution of a certain headlamp which is not based on the present invention.

DESCRIPTION OF THE PREFERRED EMBODIMENTS

Subsequently, the present invention will be described in detail with reference to the embodiments shown in the figures.

Figure 1:
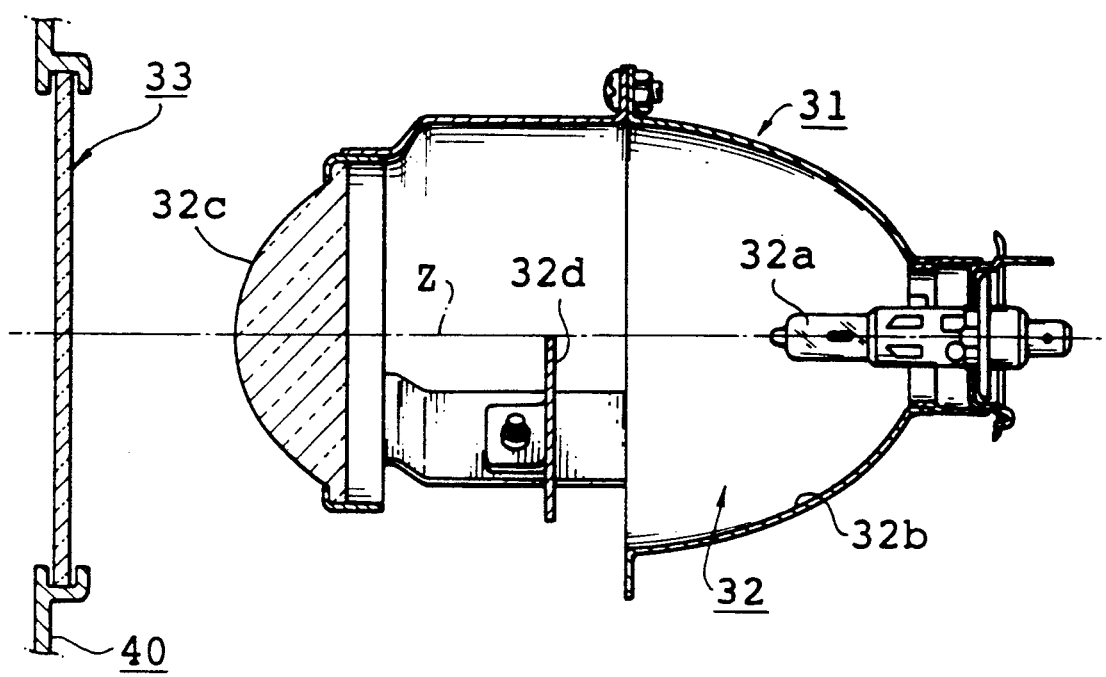
FIG. 1 is a sectional view showing an embodiment of a cornering headlamp according to the present invention.

Reference numeral 31 in FIG. 1 denotes a cornering headlamp, and the cornering headlamp 31 is constituted roughly from a lamp body section 32 and an outer lens section 33. The lamp body section 32 is of the projector type which includes an elliptical reflecting face 32b having disposed at one of a pair of focuses thereof a bulb 32a which serves as a light source, a projecting lens 32c disposed in the proximity of the other focus of the elliptical reflecting face 32b and having an optical axis Z common to the elliptical reflecting face 32b, and a light stopping plate 32d disposed in the proximity of a focus of the projecting lens 32c for determining a light distribution characteristic. The lamp body section 32 is pivoted around the optical axis Z in response to an output corresponding to a degree of inclination from an inclination sensor (not shown) which is provided on the vehicle body 40 and described hereinabove in connection with the conventional example so that the distribution characteristic H thereof may normally be kept in the same condition as that when the vehicle body 40 stands uprightly.

On the other hand, the outer lens section 33 is disposed in a fixed relationship on the vehicle body 40 side, and accordingly, when the vehicle body is inclined, the outer lens 33 is inclined at the same time.

Here, in order to simplify description and facilitate understanding of the present invention, the lamp body section 32 will be hereinafter described as having a distribution characteristic H (refer to FIG. 2) of a substantially sectoral shape of a lower half obtained by cutting a circle along a horizontal line passing the center line.

Figure 2:
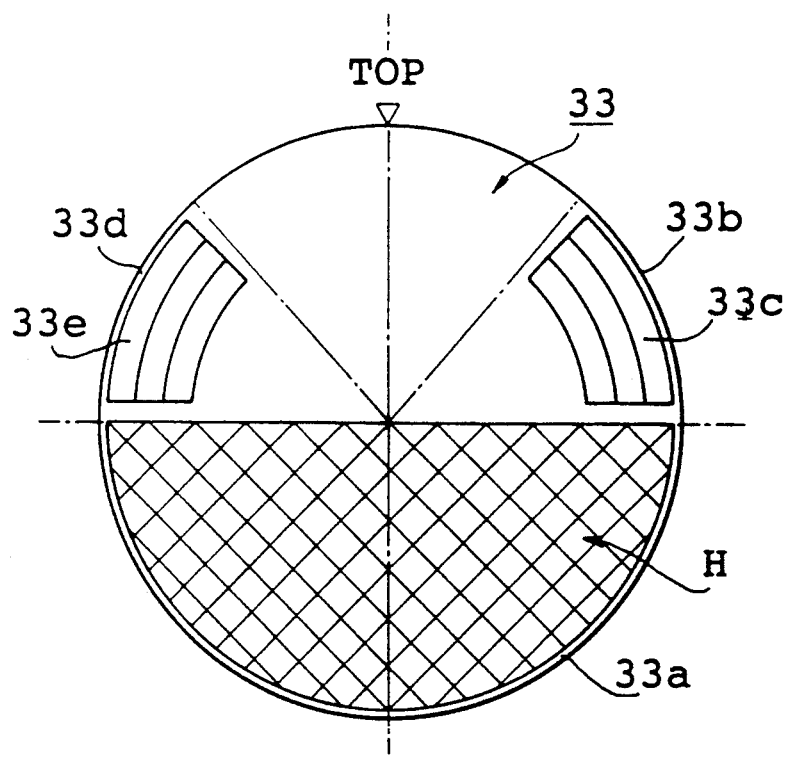
FIG. 2 is a front elevational view showing an essential part of the same embodiment.

Since the construction is employed which includes the pivotal lamp body section 32 and the fixed outer lens section 33 described above, first when the vehicle body 40 is in an upright standing condition, while straightforwardly advancing or the like, light from the lamp body section 32 passes only through a lens lower half portion 33a of the outer lens section 33 as shown in FIG. 2, and since the lens lower half portion 33a is not optically processed such as by lens cutting and accordingly is transparent, the light distribution characteristic H of light from the lamp body section 32 is not changed in shape at all by the outer lens section 33 and remains in its original shape, in which light is irradiated forwardly.

Subsequently, when the vehicle body 40 is inclined rightwardly, for example, in order to turn rightwardly, the lamp body section 32 is pivoted so that the light distribution characteristic H is maintained horizontally, but since the outer lens section 33 is fixed to the vehicle body 40, it is inclined rightwardly together with the vehicle body 40.

Figure 3:
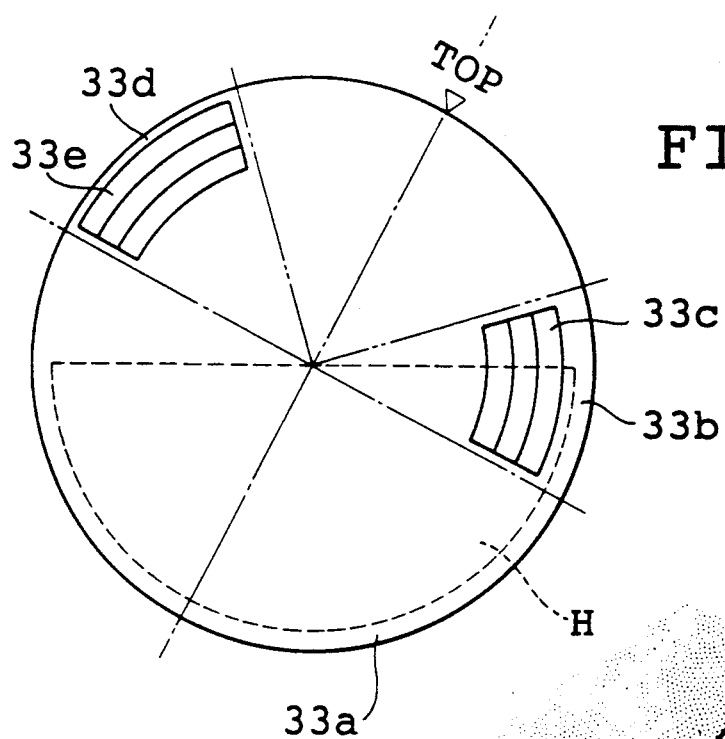
FIGS. 3 and 4 are explanatory views individually illustrating operation of the embodiment.

Such condition is shown in FIG. 3, and a part of the light distribution characteristic H portion of light from the light body section 32 provides a varying portion in light passing position such that it passes through an upper right portion of the outer lens section 33, and at a suitable portion of a rightward inclination variation portion 33b of the outer lens section 33 which appears upon rightward inclination, a rightward diffusion cut 33c is formed, for example, by prism cutting for diffusing the light distribution characteristic H passing through the portion further to the right-hand side.

Figure 4:
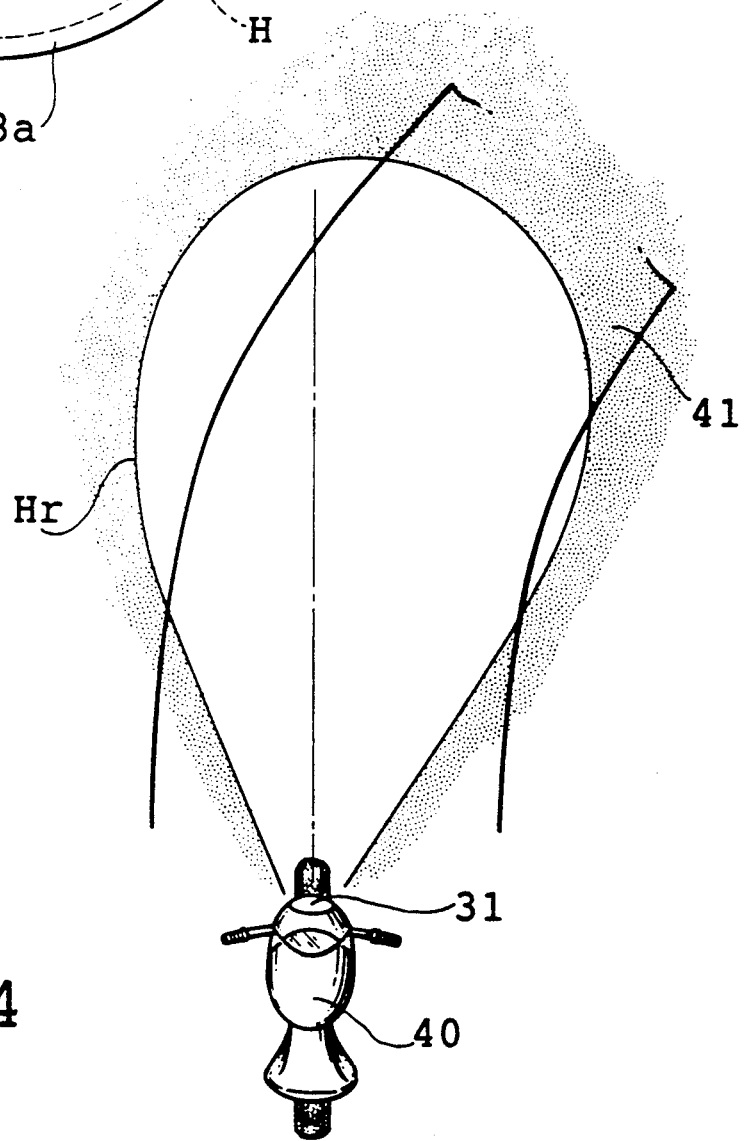

Since the rightward diffusion cut 33c is provided at the rightward inclination variation portion 33b of the outer lens section 33 as described above, the light distribution characteristic Hr when the vehicle body 40 is inclined rightwardly is diffused rightwardly and the cornering headlamp 31 also illuminates a rightwardly curved road surface 41, that is, in an advancing direction as shown in FIG. 4.

It is to be noted that reference character 33d in FIG. 2 denotes a leftward inclination variation portion, and a leftward diffusion cut 33e is provided also at the leftward inclination variation portion 33d so that, when the vehicle body 40 is inclined leftwardly, it acts in a similar manner as in the case when the vehicle body 40 is inclined rightwardly.

Here, describing an action and an effect according to the present embodiment, with the headlamp of the projector type employed as the lamp body section 32, due to its principle that a shape of the light stopping plate 32d is projected by way of the projecting lens 32c, the correlation in shape between a light distribution characteristic H at a position directly forwardly of the projecting lens 32c, that is, a position at which the outer lens 33 is provided, and that at a position on the road surface 41 to which the light is projected finally is high, and diffusion caused by the outer lens 33, for example, by an upper right half portion of the outer lens 33, appears similarly at an upper right half portion of a light distribution characteristic H when light is projected to the road surface 41. Thus, a light distribution characteristic H which coincides at a very high level with that anticipated by a designer can be obtained with the outer lens 33.

Further, the headlamp of the projector type described above is generally small in size, particularly in a diametrical direction around the optical axis Z compared to a headlamp which employs a paraboloid of revolution, and a driving section for rotating the light body section 32 can be simplified.

Figure 5:
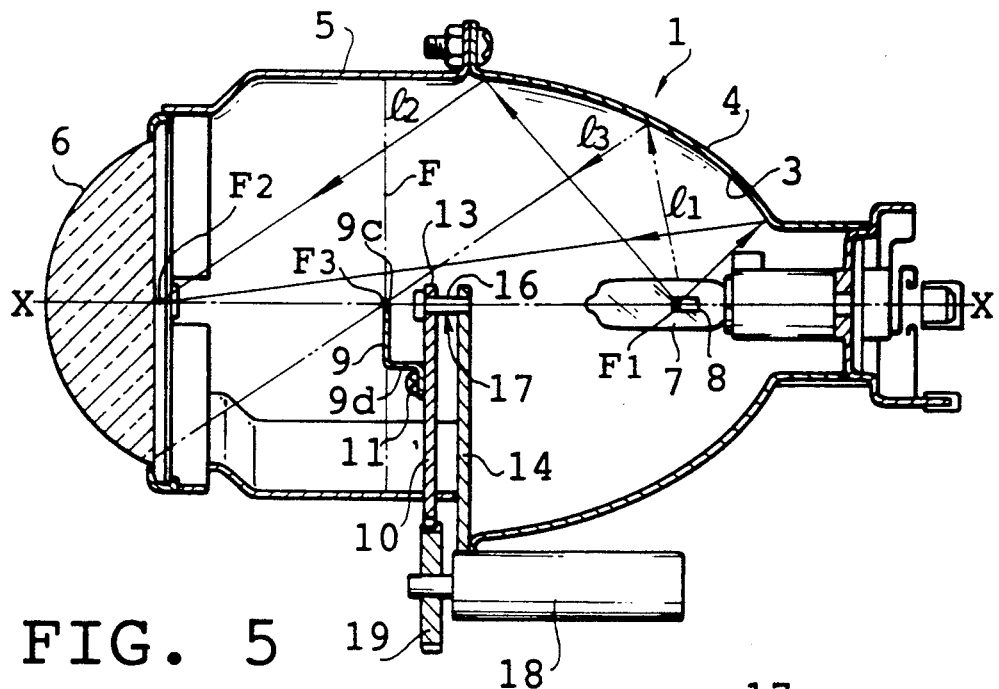
FIG. 5 is a longitudinal sectional view of a lamp main body showing another embodiment of the present invention.

FIG. 5 is a longitudinal sectional view of a lamp main body 1 of a headlamp according to another embodiment of the present invention. The lamp main body 1 is accommodated in a lamp body similar to a lamp body 2 shown in FIG. 9 and is mounted on a vehicle body. A convex lens 6 is mounted in front of a reflecting mirror 4 having a reflecting face 3 of an ellipsoid of revolution by way of a connecting frame member 5, and optical axes X of the reflecting mirror 4 and convex lens 6 coincide with each other. Reference numeral 7 denotes a bulb, and a filament 8 which serves as a light source of the bulb 7 is positioned at a first focus $F_1$ of an ellipse forming the reflecting face 3. Reference character $F_2$ denotes a second focus of the ellipse, and in the present embodiment, the second focus $F_2$ is positioned on an incidence face of the convex lens 6.

Figure 6:
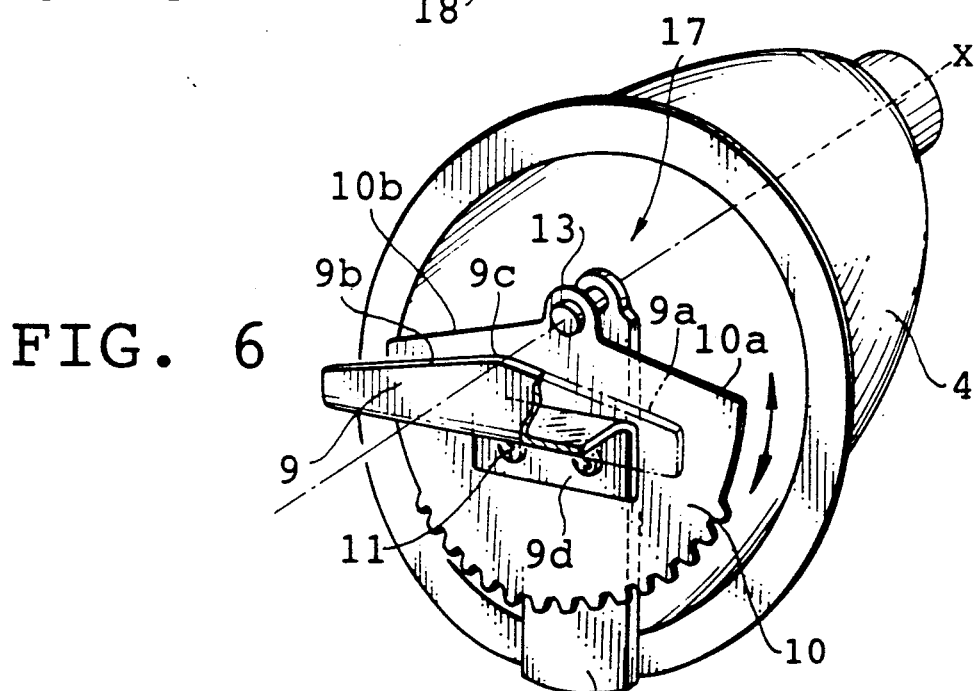
FIG. 6 is a perspective view of a light stopping plate supporting portion of the embodiment.
Figure 7:
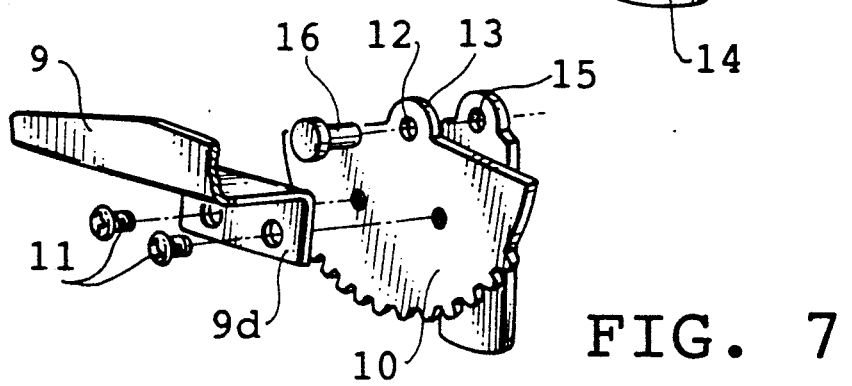
FIG. 7 is a fragmentary perspective view of the same.
Figure 10:
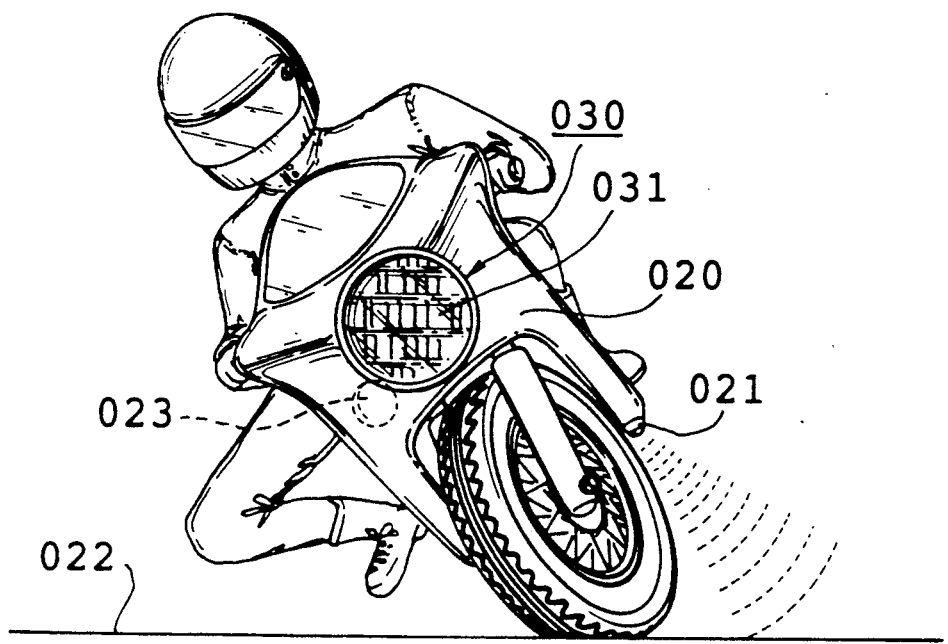
FIG. 10 is an explanatory view showing a conventional example.
Figure 11:
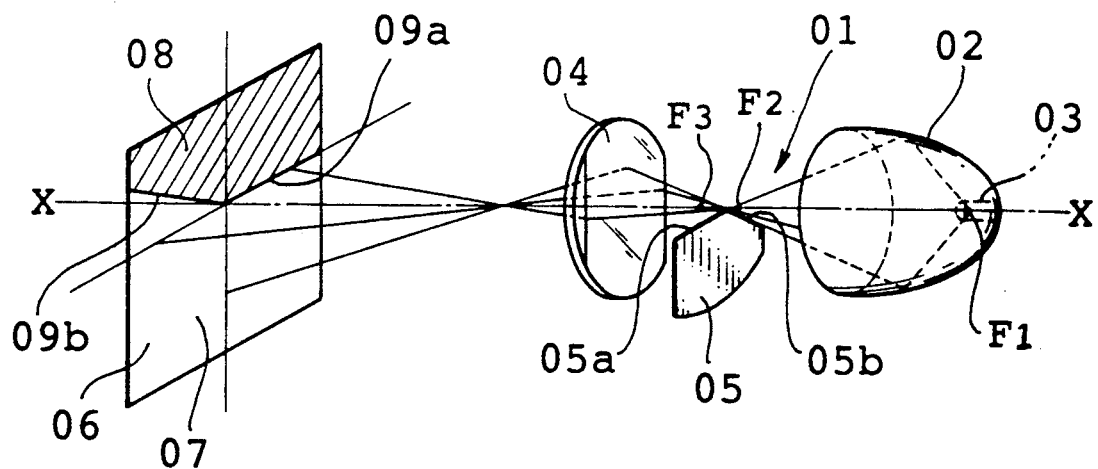
FIG. 11 is a drawing conceptively showing a conventional headlamp.

Reference character $F_3$ denotes a focus of the convex lens 6, and the central point 9c of an upper edge of a light stopping plate 9 is positioned at the focus $F_3$. The light stopping plate 9 extends in leftward and rightward directions as shown in FIG. 6. Then, while a left-hand side (left as facing the convex lens 6 side from the reflecting mirror 4 side, this similarly applies to the following description) upper edge 9a extends horizontally at the same height as the central point 9c, a right-hand side upper edge 9b is inclined downwardly from the central point 9c. A mounting portion 9d which is bent rearwardly, that is, toward the reflecting mirror 4 side is formed integrally on a lower edge of the light stopping plate 9, and the mounting portion 9d is secured to a gear plate 10 at a rear position by means of screws 11.

The gear plate 10 has a sectoral shape having a size sufficient to cover an entire lower half portion of a transverse section of the lamp main body 1, and left and right upper edges 10a and 10b of the gear plate 10 are set lower than the upper edges 9a and 9b of the light stopping plate 9, respectively. At a central portion of the upper edge of the gear plate 10, that is, at a portion located behind the central point 9c of the light stopping plate 9, a bearing hole 12 is provided which has an axial line coincident with the optical axis X, and in order to provide the bearing hole 12, a projected portion 13 is formed at the portion.

A support post member 14 secured at a lower end thereof to a lower portion of an opening edge of the reflecting mirror 4 is provided uprightly behind the gear plate 10. An upper end of the support member 14 is located rearwardly of the projected portion 13 of the gear plate 10, and a bearing hole 15 aligned with the aforementioned bearing hole 12 is provided at the portion. Then, a pivot shaft 16 is fitted in the bearing holes 12 and 15, thereby forming bearing section 17 for supporting the gear plate 10 for tilting motion on the support post member 14. The gear plate 10 is held in meshing engagement at a lower portion thereof with a drive gear 19 which is driven by a servomotor 18. Accordingly, by operating the servomotor 18, the gear plate 10 can be tilted around the axial line of the bearing section 17, that is, around the optical axis X, and the light stopping plate 9 is tilted around the optical axis X passing the central point 9c of the upper edge of the light stopping plate 9 in response to such tilting motion of the gear plate 10.

If the light source is a point light source positioned at the first focus $F_1$ of the reflecting face 3, then reflected light from an upper half portion of the reflecting face 3 is focused upon the second focus $F_2$ past a location above the light stopping plate 9 as indicated by solid line arrow marks $l_1$ and $l_2$, and then goes Out forwardly by way of a lower half portion of the convex lens 6. Meanwhile, reflected light from a lower half portion of the reflecting face 3 is stopped intermediately by the light stopping plate 9 and the gear plate 10 and will not reach the second focus $F_2$, and consequently, no light exists which goes out forwardly through an upper half portion of the convex lens 6. Accordingly, a distribution pattern is obtained wherein an upper portion is a dark portion while a lower half portion is a bright portion. However, since the filament 8 actually has a cylindrical shape, the light source is not a point light source, and consequently, also such a reflected beam of light as, for example, indicated by a chain line arrow mark $l_3$ exists, and besides such beams of light also exist which have been irregularly reflected by various portions in the lamp main body 1. Since also such light is projected forwardly through the convex lens 6, if only ideal beams of light (beams of light corresponding to $l_1$ or $l_2$ mentioned above) from the lower half portion of the reflecting face 3 are stopped, a light distribution pattern wherein a boundary line between a dark portion and a bright portion is clear cannot be obtained.

Thus, the light stopping plate 9 is disposed at the position of a focus of the convex lens 6 so that real images of the upper edges 9a and 9b may be formed on a projection plane in order that a sharp bright/dark boundary line may be obtained. In other words, a light distribution pattern is formed by an enlarged image of a plane F passing the focus $F_3$ by the convex lens 6. While a real image of a body placed at the focus of the convex lens 6 is theoretically formed at infinity forwardly of the lens, if the light projection plane is spaced sufficiently from the lens, then the degree of an out-of-focus condition of an image is low, and an actually acceptable clear image can be obtained. Then, if the light stopping plate 9 is tilted around the optical axis X by the bearing section 17, then the image is also tilted so that the distribution pattern is changed.

By the way, since the bearing section 17 is projected upwardly above the upper edges 9a and 9b of the light stopping plate 9, an enlarged real image of the bearing section 17 is formed by the convex lens 6, and if the bearing section 17 is in the plane F, then the image must be overlapped with the image of the light stopping plate 9 and a dark portion originating from the image of the bearing section 17 must project downwardly from a central portion of a bright/dark boundary line formed by the images of the upper edges 9a and 9b similar to that shown in FIGS. 13a, 13b. However, in the present embodiment, since the position of the bearing section 17 is displaced rearwardly from the focus $F_3$, a real image of the bearing section 17 is formed at a considerably near position forwardly of the convex lens 6, and as the distance forwardly from the position increases, the image is rapidly put into an out-of-focus condition. Then at a remote position, the difference in brightness by the image disappears, and only a clear bright/dark boundary line originating from the upper edges 9a and 9b of the light stopping plate 9 remains. FIG. 8a shows a light distribution pattern obtained when light from the convex lens 6 is projected on a screen erected perpendicularly to the optical axis X at a location of a certain distance forwardly of the lens. A dark portion 21 and a bright portion 22 are sectioned clearly by a bright/dark boundary line 20a originating from the upper edge 9a of the light stopping plate 9 and another bright/dark boundary line 20b originating from the upper edge 9b. If the location of the screen is nearer to the convex lens 6, images b and g of the bearing section 17 and gear plate 10 appear as indicated by a broken line g, and the portion becomes dark. However, if the screen is spaced far away from the convex lens 6, then the dark portion disappears due to an out-of-focus condition of the image and is put into a similarly bright condition as the bright portion 22 adjacent thereto. Accordingly, on an actual road, a right distribution condition is obtained wherein the dark portion 21 and the bright portion 22 are sectioned very clearly by the bright/dark boundary lines 20a and 20b as shown in FIG. 8b.

In the present embodiment, the light stopping plate 9 is supported by means of the bearing section 17 on the optical axis X which is an axial line of tilting motion thereof, and the light stopping plate 9 need not be supported at an outer peripheral portion thereof spaced from a route of light and for tilting motion around an optical axis as in the conventional arrangement, whereby the supporting structure for the light stopping plate is simplified and miniaturized remarkably.

It is to be noted that, while there must be no influence of an image of the bearing section 17 upon a light distribution pattern eve if the bearing section 17 is provided forwardly of the light stopping plate 9, that is, on the convex lens 6 side, this is not preferable because, in this instance, beams of light which are to be introduced into the convex lens 6 by way of routes different from those of the ideal beams of light $l_1$ and $l_2$ such as a beam of light $l_3$ are stopped by the bearing section 17, gear plate 10, support post member 14 and so forth.

FIG. 9 is a drawing similar to FIG. 5 described above but showing another embodiment of the present invention, and like reference numerals are applied to like portions to those of FIG. 5. In FIG. 9, a lamp body 2 which is omitted in FIG. 5 is also shown. The lamp body 2 is secured to a vehicle body frame not shown by way of a suitable support arm, and a cover lens 23 for passing emergent beams of light from the convex lens 6 therethrough is fitted in an opening at a front portion of the lamp body 2. The present embodiment is different from the preceding embodiment described above in that a light stopping plate 9 and a gear plate 10 are formed as an integrated member. Then, a support post member 14 is provided along a rear face of the gear plate 10, and an end of a pivot shaft 16 extending through a bearing hole 12 of the gear plate 10 is screwed into the support post member 14 so that the gear plate 10 may be tilted around the pivot shaft 16. The support post member 14 is secured to the lamp body 2 together with a servomotor 18, and a drive gear 19 secured to an output shaft of the servomotor 18 is held in meshing engagement with the gear plate 10. Reference numeral 24 denotes a worm wheel which is used to manually tilt the gear 10 upon adjustment or the like.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

What is claimed is:

1. A headlamp having a light distribution changing device wherein light from a light source is reflected by a reflecting mirror and then projected forwardly by way of a convex lens, said light distribution changing device being constituted such that a light stopping plate for stopping a part of light advancing from said reflecting mirror toward said convex lens is provided between said light source and said convex lens and the light distribution is changed by tilting said light stopping plate around an optical axis; characterized in that said light stopping plate is provided at a position of a focus of said convex lens on a side facing said reflecting mirror and a bearing for supporting said light stopping plate for tilting motion thereon is provided on the optical axis in a displaced relationship to a said facing said reflecting mirror with respect to said light stopping plate.

2. A headlamp claimed in claim 1, wherein said light distribution changing device comprises a gear plate positioned at said side facing said reflecting mirror side with respect to said light stopping plate, fixed to said light stopping plate and meshing with a drive gear; a support post member positioned at said side facing said reflecting mirror side with respect to said gear plate and fixed to said reflecting mirror at a lower end thereof; and a pivot shaft fitted in bearing holes formed on said gear plate and said support post member respectively.

3. A headlamp as claimed in claim 1, wherein said reflecting mirror has a reflecting face of an ellipsoid of revolution and said light source is positioned at a first focus of said reflecting face.

4. A headlamp as claimed in claim 3, wherein said convex lens is positioned substantially at a second focus of said reflecting face.

5. A headlamp as claimed in claim 1, wherein said light stopping plate is detachably fixed to a gear plate tiltable around said bearing.

* * * * *

UNITED STATES PATENT AND TRADEMARK OFFICE
CERTIFICATE OF CORRECTION

PATENT NO. : 5,158,352
DATED : October 27, 1992
INVENTOR(S) : Ikegami et al.

It is certified that error appears in the above-identified patent and that said Letters Patent is hereby corrected as shown below:

Title page, item (75): "Inventors", please change "Iohjkawa" to --Ichikawa--

Column 6, line 63, change "Out" to --out--.

Column 9, line 11 (claim 2, line 3), delete "side" (second occurrence);
Column 9, line 15 (claim 2, line 7), delete "side".

Signed and Sealed this

Twenty-eighth Day of September, 1993

Attest:

BRUCE LEHMAN

*Attesting Officer*   *Commissioner of Patents and Trademarks*